Dec. 16, 1958 A. MOTTU 2,864,269
HEADSTOCK FOR HIGHLY ACCURATE MACHINE TOOLS
Filed Aug. 22, 1955
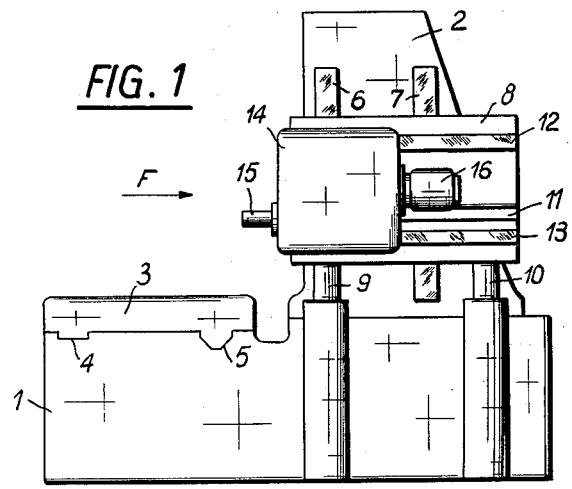
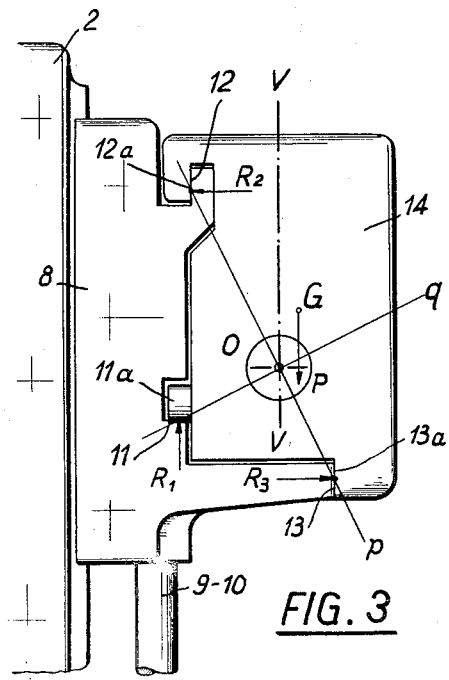
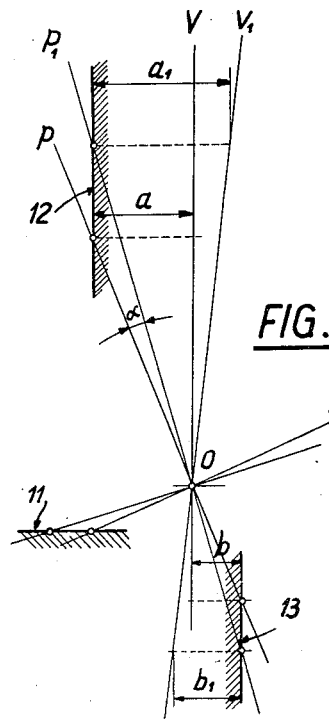

United States Patent Office 2,864,269
Patented Dec. 16, 1958

2,864,269

HEADSTOCK FOR HIGHLY ACCURATE MACHINE TOOLS

André Mottu, Geneva, Switzerland, assignor to Societe Genevoise d'Instruments de Physique, Geneva, Switzerland, a firm of Switzerland Application August 22, 1955, Serial No. 529,605

Claims priority, application Switzerland October 20, 1954

2 Claims. (Cl. 77—3)

It is a well-known fact that machine tools, the spindles of which have a horizontal axis and in particular boring machines do not allow reaching a high machining accuracy. This is due to various reasons and chiefly to the fact that the heating of the headstock produces an undesired shifting of the spindle axis. As a matter of fact, this heating expands the body of the headstock and increases the distance between the axis of the spindle and the plane of the slideways provided on the upright and slider carrying the headstock. The most objectionable point consists in that the heat developed by the moving part varies with the number of revolutions executed per minute and that the speed of cooling is not uniform, since it depends on the difference between room temperature and the temperature of the headstock. This leads to a considerable lack of stability in the location of the spindle axis.

Various means have been resorted to with a view to removing this drawback. The simplest means consist in the use of a high power fan which produces a circulation of air inside the headstock; but it is generally difficult to house such a fan which must be equipped with oil filters so as to prevent the air saturated with oil droplets projected outwardly by the gears and flowing inside the headstock, from being rejected immediately into the outer atmosphere, since this would require a frequent refilling with oil and might also inconvenience the operator.

Another prior proposition which may be applicable to headstocks sliding over two slideways, consists in making the plane or planes of the said slideways pass through the axis of the spindle and in thermally insulating the stationary or sliding elements through any known means. This solution, however is not satisfactory since it leads to constructional difficulties and allows correcting the shifting of the spindle axis only in a single direction.

The present invention has for its object to remove the above disclosed drawbacks and covers a machine tool provided with a headstock and a tool-carrying spindle having a horizontal axis, the said headstock being adapted to move horizontally over a support forming part of the machine, e. g., a vertically movable cross-member slidingly mounted on an upright of the machine.

My improved machine tool is characterized by the fact that the shifting of the headstock is obtained through the agency of three slideways parallel with the axis of the spindle and provided on a support for said headstock, two of said slideways extending vertically in planes lying to either side of the axis of the spindle while the third slideway is horizontal; the corresponding contacting surfaces provided on the headstock for engagement with said three slideways are arranged in a manner such that an oblique plane containing the axis of the spindle also contains horizontal lines forming part of the two first slideways respectively, while a second plane containing also the axis of the spindle and extending perpendicularly to the first-mentioned plane contains similarly a horizontal line forming part of the horizontal slideway.

Accompanying drawing illustrates by way of example a preferred embodiment of the invention, as applied to a boring machine. In said drawing:

Fig. 1 is an elevational view of the machine;

Fig. 2 is a partial view in the direction of the arrow F of Fig. 1;

Fig. 3 is a diagram illustrating the operation of the headstock.

Turning to Fig. 1, the frame 1 of the boring machine carries on the one hand an upright 2 and on the other hand a work-carrying table 3 sliding over the slideways 4 and 5.

The upright 2 is provided with two vertical slideways 6 and 7 along which the cross-member 8 is vertically shiftable. The said cross-member is carried by hydraulic pistons 9 and 10 and includes three horizontal slideways 11, 12 and 13 which serve for carrying and guiding the headstock 14, the spindle 15 of which is controlled by the motor 16.

The slideways 11, 12 and 13 cooperate with rollers 11a and with plane vertical surfaces 12a and 13a on the headstock, respectively, as shown in Fig. 2. The surfaces 12a and 13a are located in two parallel vertical planes one of which extends to the front and the other to the rear of the axis O of the spindle 15. An oblique plane $p$ containing the axis of the spindle extends through the surfaces 12a and 13a of the slideways 12 and 13 so as to cut them along a horizontal line approximately at mid-height thereof. A second plane $q$ perpendicular to said plane $p$ which also contains the axis O of the spindle cuts the horizontal surface of the slideway 11 along a horizontal line crossing the generating line of the roller 11a contacting with said horizontal surface substantially towards the middle of said line. Said slideway 11 serves mainly for carrying the headstock and the weight $p$ of the latter applied to the center of gravity G of said headstock forms, with the reaction $R_1$ exerted by the slideway 11 engaged by the rollers, a torque which is balanced by the opposite torque formed by the reactions R–2 and R–3 exerted by the vertical slideways 12 and 13 on the cooperating surfaces 12a and 13a of the headstock.

It will be assumed that the slider formed by the cross-member 8, by reason of its large cooling surface and its comparatively restricted contacting surface with the source of heat formed by the headstock, is heated only to a small extent by the latter. The slideways 11, 12 and 13 may consequently be considered as stationary reference surfaces.

In Fig. 3 are shown diagrammatically the axis O of the spindle and the slideways 11, 12 and 13. Furthermore, the traces of the planes $p$ and $q$ already mentioned and of the plane $v$ passing vertically through the axis O of the spindle, have been drawn for the position of the headstock at room temperature while $a$ and $b$ designate the distance between the plane $v$ and the slideways 12 and 13 respectively. When the temperature of the headstock is higher than room temperature, it is apparent that the distances $a$ and $b$ have increased respectively to $a$–1 and $b$–1 so as to produce a rocking of the headstock, the deformations being illustrated to an exaggerated extent so as to make the drawing clearer.

As a consequence of the particular arrangement of the rollers 11a and of the surfaces 12a and 13a and also of the possibility of their being slightly shifted with reference to the surfaces of the corresponding slideways 11, 12 and 13, the rocking of the headstock is executed round the axis O of the spindle, which remains stationary. The new position assumed by the headstock is defined by the further traces $p$–1, $q$–1 and $v$–1 of the planes $p$, $q$ and $v$. The rocking of the headstock, which is in practice very small, constitutes no drawback for the accuracy of the machine and it allows reaching the proposed object of the invention by holding the spindle axis stationary with reference to the slider and upright carrying the headstock.

What I claim is:

1. In a machine tool including a headstock and a tool-carrying spindle revolubly carried by the headstock to rotate round a horizontal axis, the provision of a support for said headstock provided with three slideways parallel with the axis of the spindle and of which two extend vertically in planes located respectively to either side of the axis of the spindle and the third one is horizontal, and treble means carried by the headstock for engagement with the three slideways respectively and of which means two engaging the vertical slideways extend each across an element of a common sloping plane containing the axis of the spindle and the third means engaging the horizontal slideway extends across an element of a plane substantially perpendicular to the first plane and also containing the axis of the spindle.

2. In a machine tool including a headstock and a tool-carrying spindle revolubly carried by the headstock to rotate round a horizontal axis, the provision of a support for said headstock provided with three slideways parallel with the axis of the spindle and of which two extend vertically in planes located respectively to either side of the axis of the spindle and the third one is horizontal and faces upwardly, a roller system revolubly carried by the headstock for running engagement with the last mentioned slideway, the headstock being provided with two vertical longitudinally extending surfaces adapted to slidingly engage the two first mentioned slideways at points lying in a common sloping plane containing the spindle axis and perpendicular to a plane also containing said spindle axis and passing through a point of contact between the roller system and the third, horizontal slideway.

References Cited in the file of this patent

UNITED STATES PATENTS

| 838,999 | Hylander | Dec. 18, 1906 |
| 2,415,158 | Bowen | Feb. 4, 1947 |
| 2,674,925 | Berthiez | Apr. 13, 1954 |